(12) United States Patent
Miguel Sanz et al.

(10) Patent No.: US 7,929,048 B2
(45) Date of Patent: Apr. 19, 2011

(54) IMAGE ACQUISITION MODULE FOR MONITORING APPLICATIONS OF THE EXTERNAL SURROUNDINGS OF A VEHICLE

(75) Inventors: Santiago Miguel Sanz, L'Hospitalet de Llobregat (ES); Daniel Bande Martinez, Barcelona (ES)

(73) Assignee: Fico Mirrors, SA, Barcelona (ES)

( * ) Notice: Subject to any disclaimer, the term of this patent is extended or adjusted under 35 U.S.C. 154(b) by 1105 days.

(21) Appl. No.: 10/526,801

(22) PCT Filed: May 22, 2003

(86) PCT No.: PCT/ES03/00240
§ 371 (c)(1), (2), (4) Date: Oct. 21, 2005

(87) PCT Pub. No.: WO2004/104626
PCT Pub. Date: Dec. 2, 2004

(65) Prior Publication Data
US 2006/0139482 A1 Jun. 29, 2006

(51) Int. Cl.
*H04N 5/225* (2006.01)
(52) U.S. Cl. .......... 348/373; 348/148
(58) Field of Classification Search ............ None
See application file for complete search history.

(56) References Cited

U.S. PATENT DOCUMENTS

| | | | |
|---|---|---|---|
| 5,172,235 A | 12/1992 | Wilm et al. | |
| 5,221,964 A | 6/1993 | Chamberlain et al. | |
| 6,420,975 B1* | 7/2002 | DeLine et al. | 340/815.4 |
| 6,594,399 B1* | 7/2003 | Camus et al. | 382/260 |
| 2002/0071676 A1* | 6/2002 | Chu | 396/419 |
| 2002/0101041 A1* | 8/2002 | Kameyama | 277/628 |
| 2002/0113873 A1* | 8/2002 | Williams | 348/118 |
| 2002/0126457 A1* | 9/2002 | Kameyama | 361/728 |
| 2003/0098908 A1* | 5/2003 | Misaiji et al. | 348/148 |
| 2003/0103142 A1* | 6/2003 | Hitomi et al. | 348/148 |
| 2006/0171704 A1* | 8/2006 | Bingle et al. | 396/419 |

FOREIGN PATENT DOCUMENTS

| | | |
|---|---|---|
| EP | 0 591 743 A1 | 4/1994 |
| EP | 0 582 236 B1 | 6/1998 |
| JP | 02-124418 | 5/1990 |
| JP | 02124418 A * | 5/1990 |
| JP | 2001-039243 | 2/2001 |
| JP | 2001039243 A * | 2/2001 |
| JP | 2002-006378 | 1/2002 |
| JP | 2002-221748 | 8/2002 |
| JP | 2002-341432 | 11/2002 |
| WO | WO 01/61371 A2 | 8/2001 |

* cited by examiner

*Primary Examiner* — Lin Ye
*Assistant Examiner* — Dennis Hogue
(74) *Attorney, Agent, or Firm* — RatnerPrestia

(57) ABSTRACT

An image acquisition module for monitoring the external surroundings of a vehicle is provided. The image acquisition module includes a housing with a protected interior against at least moisture and a window hermetically closed by a transparent element; an electronic circuit accommodated in the housing and associated with connection device with the exterior for supply and for bidirectional signal exchange; an image detector connected to the electronic circuit and facing the window; a support attached to the housing to carry an optical system between the image detector and the window; and positioning and releasable fixation device to enable the centering of the optical system and the releasable fixation of the module to an exterior structure of a vehicle.

14 Claims, 3 Drawing Sheets

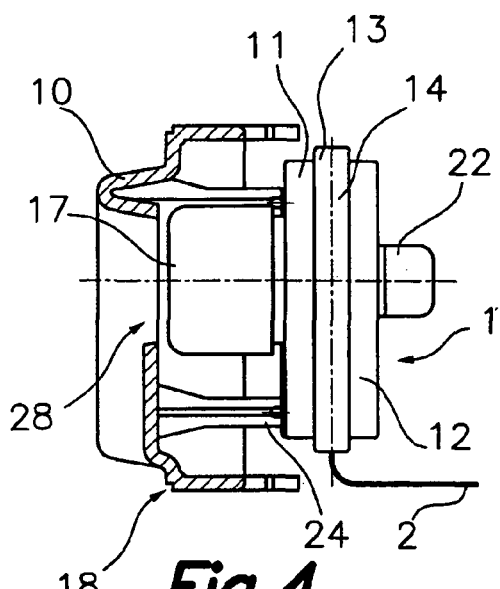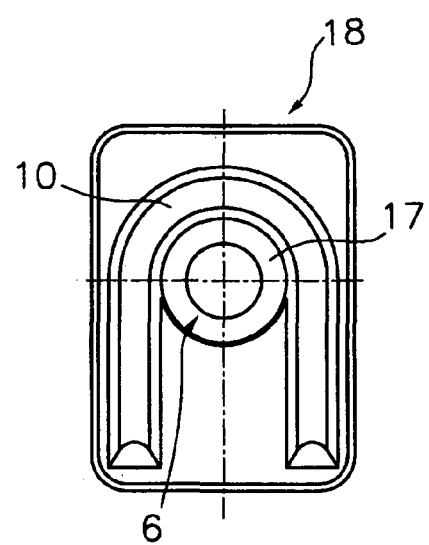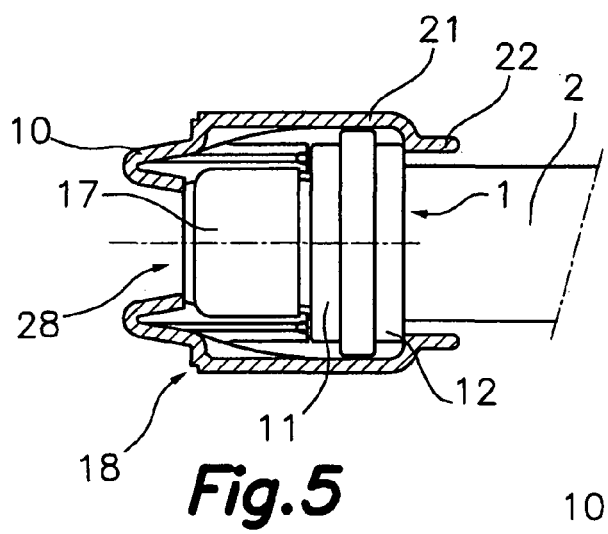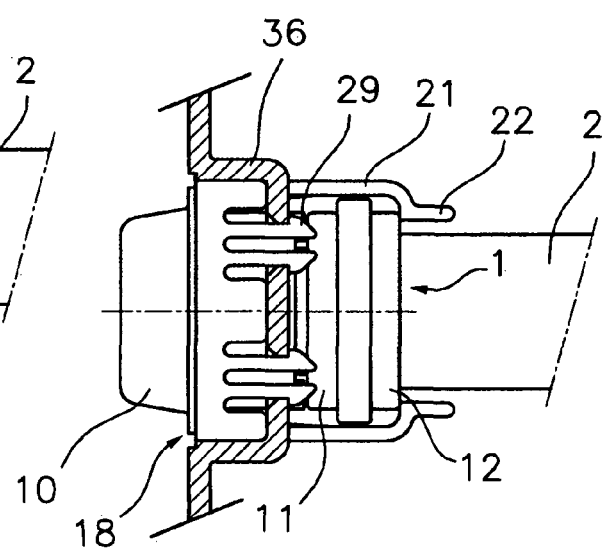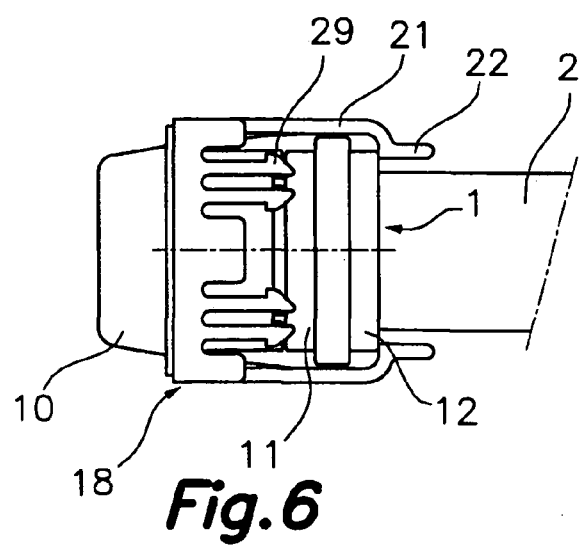

IMAGE ACQUISITION MODULE FOR MONITORING APPLICATIONS OF THE EXTERNAL SURROUNDINGS OF A VEHICLE

This application is the U.S. national phase application of PCT International Application No. PCT/ES2003/000240, filed May 22, 2003.

SCOPE OF THE INVENTION

The present invention relates to an image acquisition module for monitoring applications of the external surroundings of a vehicle, consisting of a housing, fixable in a releasable manner to an external structure of a vehicle, which protects and accommodates an image detector in its interior, associated with an electronic circuit which, through an optical system, executes the mentioned image acquisition.

ANTECEDENTS OF THE INVENTION

The patent application EP-A-0591743 describes a device detecting relative positions between vehicles, by means of an optical sensor associated with a rear view mirror, being this optical sensor associated with an electronic processing unit connected to a central information system of the vehicle, receiving the latter the processed signals. Even though, in the mentioned antecedent one states the possibility of the device consisting of an optoelectronic sensor based on CCD technology, its structure is not described in detail and, furthermore, no characteristics are given, nor is the system described where the optical device is integrated, nor anything about the physical location of the device within the vehicle.

The patent application WO-A-01/61371 of the same applicant describes an object presence detection device similar to the object of the present invention, however, in that case, specially referring to the process followed when acquiring and processing the images, once digitalized and previously amplified, as well as referring to the different calculation algorithms susceptible to being used. In this antecedent, one describes that a photo sensor and an electronic circuit, responsible for the digitalization of images, are physically united in a multi-chip module, however, as in the previous patent application, one does not describe how this device is disposed or physically mounted in the vehicle.

In the mentioned antecedents, even though reference is made to its location in a vehicle, and one has stated the possibility that both, the optic sensor and the processing unit, are disposed in the interior of a rear view mirror of the vehicle carrying housing, no mention is made to isolation devices for themselves regarding ambient and external conditions, as for example rain, moisture, dirt, strikes, etc., nor to the protection referring to luminous incidence.

The patent U.S. Pat. No. 5,221,964 describes an expandable camera module CCD similar to the object of the present application, regarding the inclusion of an optical sensor and an associated circuit in the interior of a housing, in this case a metallic one with tubular form, for its protection regarding the exterior. However, no mention is made to whether it is hermetically closed, or if the camera is protected against rain and adverse luminous conditions. Furthermore, no suggestion is made about the possibility of the mentioned module for being used for a vehicle.

Therefore, it is necessary to offer an alternative to these antecedents, in the form of a module similar to the one explained in the previous patents and patent applications, however, focussing on its physical implementation for its installation into a vehicle, offering a better isolated and protected means from the exterior as the already known, both from the external agents, and from moisture, dust, for example, as well as from luminous incidences which may alter, and even damage almost fully, the image quality to be acquired by the camera.

The purpose of the present invention is to offer an image acquisition module for monitoring applications of the external surroundings of a vehicle, in particular of an automobile or a truck, including the advantages stated in the previous paragraph, i.e. to warrant a good operation under various types of adverse situations, arising from external agents, as well as from the luminous incidence impacting on the mentioned module.

SHORT DESCRIPTION OF THE INVENTION

The image acquisition module for monitoring applications of the external surroundings of a vehicle consists of the following: a housing with a protected interior, at least from moisture and a hermetically closed window by a transparent element, which incorporates in its interior an electronic circuit associated with connecting means to the exterior, an image detector connected to said electronic circuit and opposed to said window, a supporting device connected to the mentioned housing to carry an optical system between the said image detector and the said window; as well as positioning means and releasable fixation means, in order to facilitate at least the centering of said optical system and the releasable fixation of the module to an external structure of the vehicle. Furthermore, said module disposes of incorporated protection means from external agents and luminous incidences, materialised in the form of a visor element, a car gutter, as well as conditioning means regarding the light pass through the mentioned transparent element.

A mounting adapter has been provided for, in which said visor element and car gutter are integrated, around its opening, in order to couple the housing to the mentioned external structure of a vehicle. Therefore, the mentioned mounting adapter comprises at least positioning means and releasable fixation means for the fixation of the housing in cooperation with said positioning means and said releasable fixation means of the housing, guaranteeing a predetermined location of said opening and the visor and car gutter elements in relation to the window, as well as releasable fixation means for the releasable fixation of said mounting adapter to said exterior structure of a vehicle.

SHORT DESCRIPTION OF THE DRAWINGS

Other characteristics of the invention will appear clearer starting from the following description of preferred embodiments, illustrated in the enclosed drawings, which shall be regarded in an illustrative but not limiting manner.

The enclosed drawings show the following:

FIG. 3 is a front elevation view of an image acquisition module coupled to a mounting adapter, of a first preferred embodiment.

FIG. 4 is a side elevation view, partially sectioned, of the module and adapter assembly of FIG. 3.

FIG. 5 is a ground view, partially sectioned, of the module and adapter assembly of FIG. 3.

FIG. 6 is a ground view of the module and adapter assembly of FIG. 3.

FIG. 7 is a ground view of the module and adapter assembly of FIG. 3 in an exterior structure of a vehicle.

DETAILED DESCRIPTION OF A PREFERRED EMBODIMENT

Figure 1:
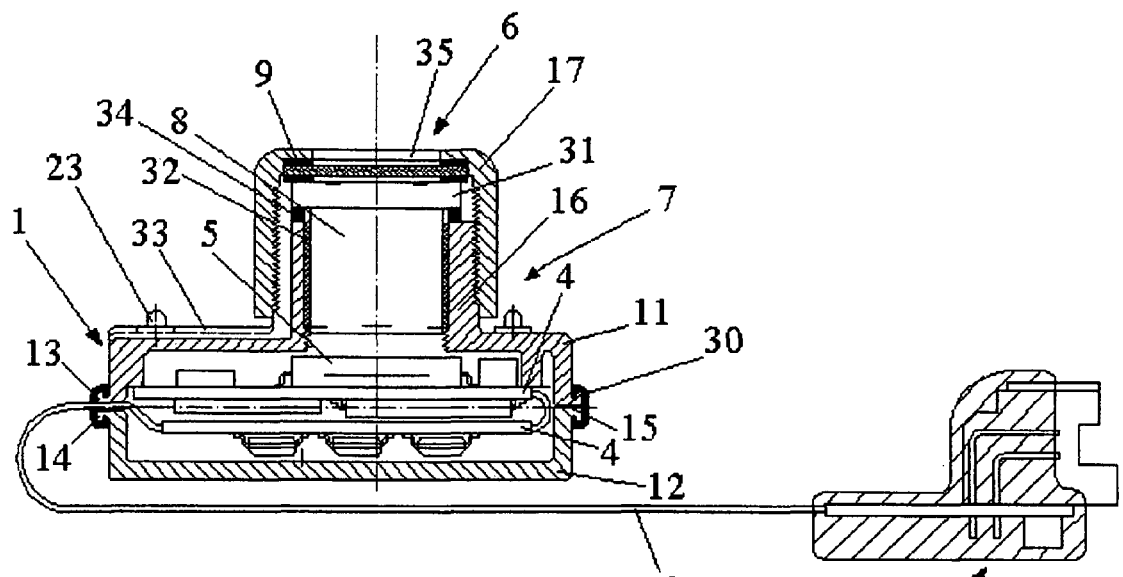
FIG. 1 shows a transversal section view of an image acquisition module, where one may observe a housing with a series of components in its interior, as well as a wiring associated with a connector.
Figure 2:
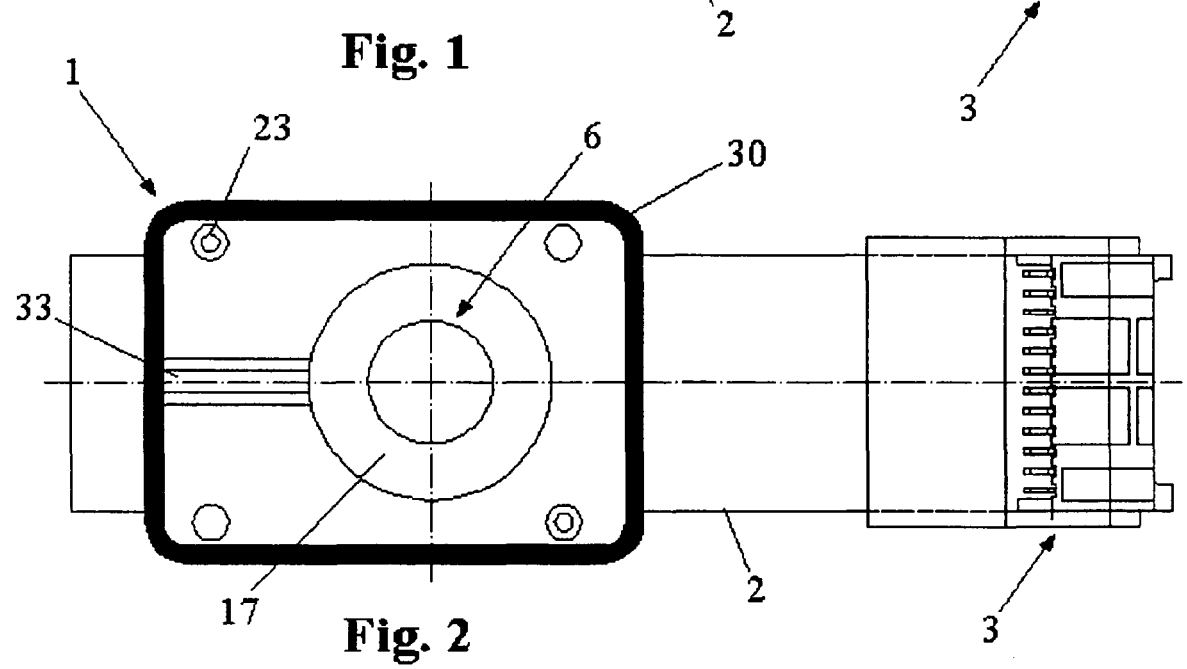
FIG. 2 is a ground view of the FIG. 1 module, where one may appreciate part of the positioning and fixation system of the mentioned module.

The following explanation will refer to all the exposed figures whenever the stated facts are common to all the described preferred embodiments. When explaining a specific peculiarity or characteristic of a certain preferred embodiment, this will be duly indicated.

As shown by these figures, the image acquisition module for monitoring applications of the external surroundings of a vehicle comprises:

- a housing 1 with a protected interior at least from moisture and a hermetically closed window 6 by a transparent element 35;
- an electronic circuit 4 accommodated in said housing 1 and associated with connection means with the exterior, for the supply and bidirectional signal exchange;
- an image detector 5 connected to said electronic circuit 4 and facing said window 6, advantageously integrated in an A.S.I.C.
- a support 7 attached to the housing 1, in order to carry an optical system 8 between said image detector 5 and said window 6; and
- positioning means and releasable fixation means, in order to facilitate, at least, the focussing of said optical system 8 and the releasable fixation of the module to an exterior structure 36 of a vehicle.

The referred housing 1 consists of two concave halves 11, 12 with respective perimetral borders 13, 14, facing each other, disposed back-to-back throughout a joint 15 and respective continuous flanges extended externally, adjacent to said perimetral borders 13, 14, being provided with an annular elastic sealing element 30 embracing both continuous flanges and covering said joint 15. In a portion of at least one of said perimetral borders 13, 14 there is a recess to provide an exit for a multicore wiring 2, executed for example by means of a flexible printed circuit. Said annular elastic sealing element 30 comprises a longitudinal slit adjacent to said exit for the mentioned multicore wiring 2, through which slit passes the multicore wiring 2.

In a possible preferred embodiment the previously mentioned optical system 8 comprises a tubular body defining an external flange 31 and an externally screw threaded portion 32, and said support 7 comprises an appendix 16, of tubular configuration, protruding from one of the concave halves 11, 12 of housing 1 including said appendix 16 an internal screw thread screw-coupled to the optical system 8.

An elastic sealing element 34 is disposed in compressed form between said external flange 31 of the optical system's body 8 and one end of the appendix 16, with the aim to protect the accommodated components in the interior of the housing 1 from moisture. This protection is achieved, furthermore, by disposing the mentioned transparent element 35 between one end of the optical system 8 and one interior backing of a cover 17 coupled externally with said appendix 16, consisting said window 6 of an opening in the background wall of the cover 17.

The mentioned appendix 16, of the support 7 of the housing 1, is cylindrical and externally screw threaded, and the mentioned cover 17 is, furthermore, cylindrical and internally screw threaded, in order to screw-couple the appendix 16, which includes an axial slot 33 in the external screw thread for the pass of, at least, one electrical cable.

Said appendix 16 is integral of one of said concave halves 11, 12 of housing 1 which, as well as cover 17, were obtained optionally by injection moulding with a high coefficient of heat conductivity material.

The mentioned window is associated with protection means from external agents and the luminous incidence, guaranteeing an appropriate light pass through said transparent element 35. Said protection means are materialized in the form of a visor element 10 disposed around of at least a part of said window 6, acting as a protection in case of rain, avoiding the incidence of rain drops on the window, and, furthermore, to protect the camera from the sunrays, a car gutter element 27 is disposed around at least a part of said window 6, offering a way out for water in the mentioned case of rain, projecting water to the ground and avoiding water from accumulating in front of the window. Said visor element 10 together with said car gutter will form, in case both of them together surround completely the window 6, a front depression 19 (FIGS. 8 and 9), that in a preferred embodiment could be extended into a tubular configuration 20 (see FIG. 9) externally connected to a plug around the mentioned support 7 for the optical system 8. Said window 6 is, furthermore, associated with conditioning means of the conditions of the light pass through said transparent element 35, avoiding in particular steam and ice deposit, and that comprises an electrical heating device 9 associated with the mentioned transparent element 35 and/or an optical system 8, in connection with said connection means with the exterior, and forming at least a resistance in the form of a printed ring deposited in at least one face of a peripheral area of the transparent element 35 and connected to the current supply.

The mentioned connection means with the exterior, for the supply and bidirectional signal exchange, could consist of a multicore wiring 2, in the form of a flat tape attached to an exterior multiple connector 3, which, in another preferred embodiment could be directly integrated in the housing 1, and therefore not needing of said multicore wiring 2, or even without needing, the multiple connector 3 and the multicore wiring 2, being both substituted by a radio or infra-red ray signals emitter/receptor, for example.

The mentioned visor element 10 is in a certain angle inclined outwards and upwards, between 0 and 15°, in respect of a central vision line of the image detector 5, and said car gutter element 27 is in a certain angle inclined outwards and downwards, between 45° and 90°, in respect of a central vision line of the image detector of image 5. Another characteristic of both configurations is that some of the more protruding zones of the visor 10 and/or car gutter elements 27 are at a certain distance of a plane in which the window 6 is disposed, not less than the diameter of the window 6.

The said housing 1 could be directly coupled to an exterior part of a vehicle, or even attached by means of a mounting adapter 18. In this second case, the mentioned visor element 10 and car gutter element 27 could be integrated around an opening 28 of said mounting adapter 18. Said mounting adapter 18 includes positioning means and releasable fixation means for the fixation of said housing 1, possibly of various and different type depending on the application example, which will be properly explained later on, which in cooperation with said positioning means and releasable fixation means of said housing 1, guarantees a predetermined position of said opening 28 and visor 10 (FIGS. 3 and 9) and car gutter elements (FIGS. 8 and 9) in relation to the window 6, and releasable fixation means for the releasable fixation of said mounting adapter 18 to said external structure 36 of a vehicle.

In the case the housing 1 is directly coupled to an external structure 36 of a vehicle, said mounting could be executed in two ways, depending on if the visor 10 and car gutter elements 27 would be disposed in said external structure 36 of a vehicle or in the housing 1 itself. In the first case, said visor 10 and car gutter elements 27 would be integrated around an existing opening in said external structure 36 of a vehicle, said external structure 36 including positioning means and releasable fixation means for the fixation of said housing 1 and the external structure 36 of a vehicle, which in cooperation with said positioning means and said releasable fixation means of the housing 1, guarantees a predetermined position of said opening and visor 10 and car gutter elements 27 in relation to the window 6. In either case, the module fixation to the external structure 36 of a vehicle could be executed in several ways, for example configuration by form-fitting, an example thereof could be that the external structure 36 of a vehicle is a rear view mirror housing, previewing a cavity therein or the fitting of the housing 1 thereinto and a lid covering the cavity trapping an immobilizing in position the module within said cavity.

Figure 8:
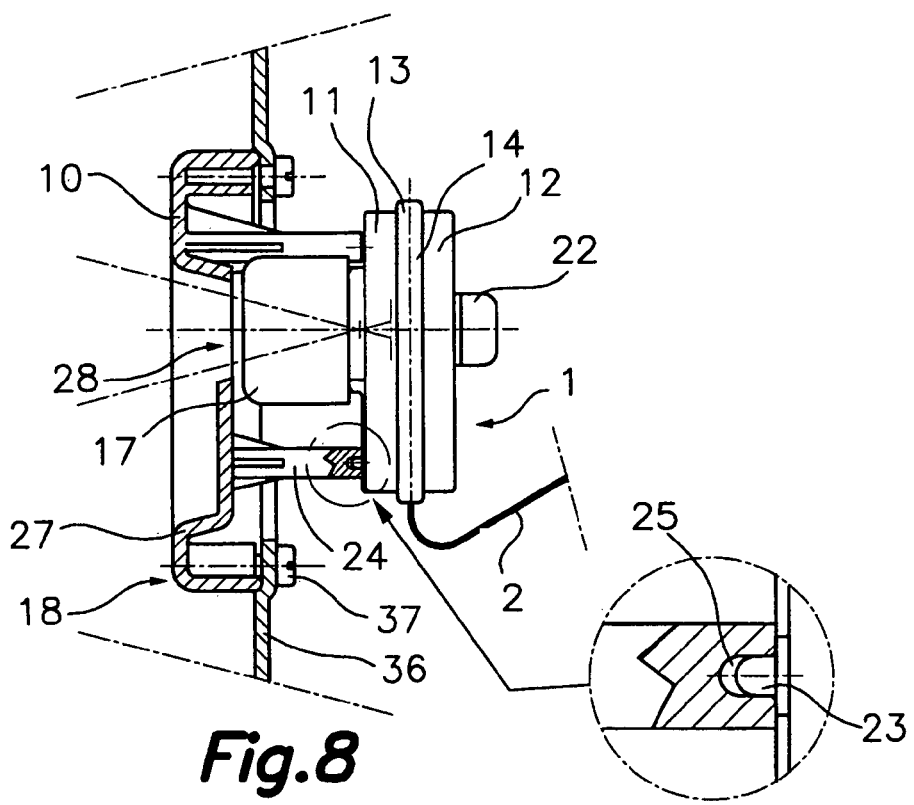
FIG. 8 is a side elevation view, partially sectioned, of an image acquisition module coupled to a mounting adapter, and mounted on an exterior structure of a vehicle, of a second preferred embodiment. An extended detail has been extracted therefrom.

The mentioned releasable fixation means for the fixation of mounting adapter 18 to external structure 36 of a vehicle, may include elastic pressurized fixation means 29, as may be seen in FIG. 6, or screws 37, as may be seen in FIG. 8, or fixation configurations by form-fitting, or a combination of the mentioned elastic pressurized fixation means 29 with the cited configuration by form-fitting, as may be observed in FIG. 7.

Concerning the releasable fixation means between the mounting adapter 18 and the housing 1, in the three preferred embodiments shown in the figures, this is made by means of at least a pair of elastic arms 21 ending in projections 22, for example in the form of a nail extending themselves from the mounting adapter 18, in order to laterally embrace the housing 1 and snap-fit fixate, by means of said projections 22, on shoulders existing in the housing 1. Obviously, any other fixation alternative would be possible, as for example the fixation by means of screws or form-fitting, in which case an internal face of the mounting adapter 18 could by provided with a configuration in which the housing 1 and the arms analogous to the ones described before, would fit in order to immobilize the housing 1.

With regards to the previously mentioned positioning means between the adapter 18 and the housing 1, these comprise support members 24 (FIG. 8 and detail) integrated in the mounting adapter 18 (in case this adaptor is necessary) which are attached to a front part of the housing 1 with a view to maintain the visor 10 and car gutter elements 27 and said opening 28 at a predetermined distance from the window 6. Said support members 24 dispose at their ends of holes 25, in which stubs 23 which protrude from a part of the housing 1 are inserted. The tubular configuration 20 (see FIG. 9) previously described, would also help for the positioning between the mounting adapter 18 and the housing 1, once it is connected exteriorly to the plug around said support 7 for optical system 8.

The mentioned external structure 36 of a vehicle, in which the module object of the present invention could be installed, could consist of a rear view mirror housing of a vehicle, or a bumper, or any other part of the same, in particular a receptacle susceptible of being used therefor.

Figure 9:
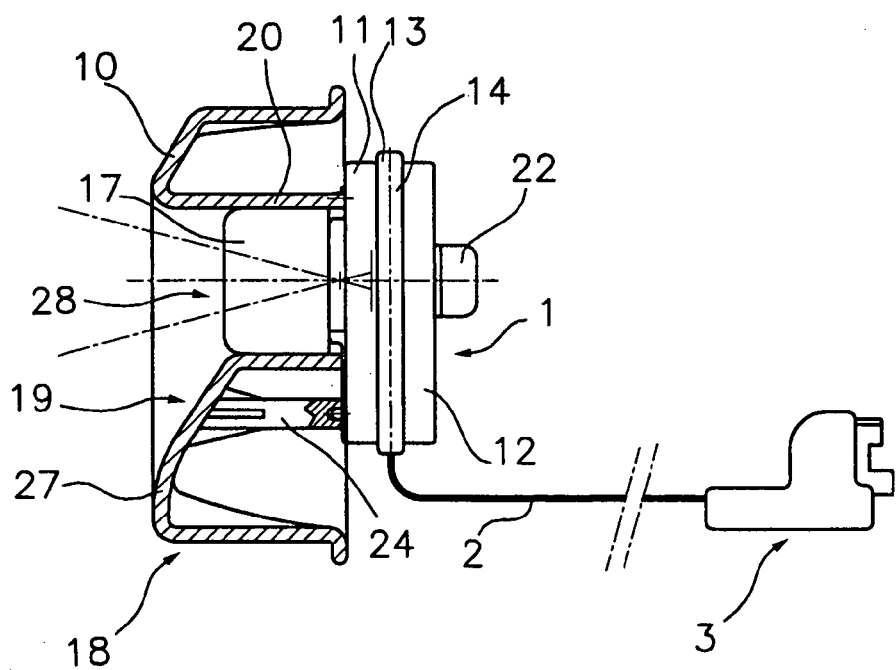
FIG. 9 is a side elevation view, partially sectioned, of an image acquisition module, with a wiring associated with a connector and coupled to a mounting adapter, of a third preferred embodiment.

When comparing FIGS. 4, 8 and 9, we may observe how the form, size and angle of the visor 10 and car gutter elements 27 are different in each case, observing that in FIG. 4 the car gutter element 27 does not even exist. All this shows the different possible mounting adapters which can be used for the same task.

An expert in the state of the art could introduce changes and modifications in the described preferred embodiments without leaving aside the scope of the invention as defined by the enclosed claims.

The invention claimed is:

1. An image acquisition module for monitoring applications of the external surroundings of a vehicle, comprising:
a housing with an interior protected against at least moisture and a window hermetically closed by a transparent element;
an electronic circuit accommodated in said housing and associated with connection means for supply and bidirectional signal exchange with the exterior;
an image detector connected to said electronic circuit and opposed to said window;
a support attached to the housing to carry an optic system between said image detector and said window;
a mounting adapter comprising an opening allowing light to pass towards said window and a visor element and a gutter element protecting said window from luminous incidence and from external agents; and
positioning means for positioning said mounting adapter with respect to said optic system and releasable fixation means for releasably fixing the module to an external structure of a vehicle,
the housing and the mounting adapter comprising respective first and second releasable fixation members and respective first and second centering members cooperating with each other for releasable fixing the housing to said mounting adapter and for positioning the window with respect to said opening, said visor element and said gutter element, and
the mounting adapter comprising releasable fixation portions for releasable fixing said mounting adapter to said external structure of a vehicle,
wherein said first centering members comprise stubs protruding from the housing, and said second centering members comprise support members formed in the mounting adapter, said support members being in contact with the housing and the support members having holes in which said stubs are inserted.

2. The module, according to claim 1, wherein said first releasable fixation members comprise shoulders formed in the housing and said second releasable fixation members comprise at least a pair of elastic arms extending from the mounting adapter and laterally embracing the housing, said elastic arms having end projections attaching by snap-fit on said shoulders in the housing.

3. The module, according to claim 1, wherein said first centering members comprise said support for the optical system on the housing and said second centering members comprise a tubular configuration formed in the mounting adapter externally plug connected around said support for the optical system.

4. The module, according to claim 1, wherein said releasable fixation portions comprised in the mounting adapter for releasable fixing the mounting adapter to the external structure of a vehicle are selected from a group including snap-fitting elastic portions, screw receiving portions, and form-fitting fixation portions.

5. The module, according to claim 1, wherein said exterior structure of a vehicle is an exterior rear view mirror housing of a vehicle.

6. The module, according to claim 1, wherein said visor element is in a small angle inclined outwards and upwards with respect to a central vision line of the image detector, said small angle being approximately within an interval from 0 to 15 degrees.

7. The module, according to claim 1, wherein the window is arranged in a plane and has a window diameter, and a distance between said plane and zones of the visor or gutter elements most protruding from said plane is not less than said window diameter.

8. An image acquisition module for monitoring applications of the external surroundings of a vehicle, comprising:
- a housing with an interior protected against at least moisture and a window hermetically closed by a transparent element;
- an electronic circuit accommodated in said housing and associated with connection means for supply and bidirectional signal exchange with the exterior;
- an image detector connected to said electronic circuit and opposed to said window;
- a support attached to the housing to carry an optic system between said image detector and said window;
- a mounting adapter comprising an opening allowing light pass towards said window and a visor element protecting said window from luminous incidence and from external agents; and
- positioning means for positioning said mounting adapter with respect to said optic system and releasable fixation means for releasably fixing the module to an external structure of a vehicle,
- the housing and the mounting adapter comprising respective first and second releasable fixation members and respective first and second centering members cooperating with each other for releasable fixing the housing to said mounting adapter and for positioning the window with respect to said opening and said visor element, and
- the mounting adapter comprising releasable fixation portions for releasable fixing said mounting adapter to said external structure of a vehicle,
- wherein said first centering members comprise stubs protruding from the housing and said second centering members comprise support members formed in the mounting adapter, said support members being in contact with the housing and the support members having holes in which said stubs are inserted.

9. The module, according to claim 8, wherein said first releasable fixation members comprise shoulders formed in the housing and said second releasable fixation members comprise at least a pair of elastic arms extending from the mounting adapter and laterally embracing the housing, said elastic arms having end projections attaching by snap-fit on said shoulders in the housing.

10. The module, according to claim 8, wherein said first centering members comprise said support for the optical system on the housing and said second centering members comprise a tubular configuration formed in the mounting adapter externally plug connected around said support for the optical system.

11. The module, according to claim 8, wherein said releasable fixation portions comprised in the mounting adapter for releasable fixing the mounting adapter to the external structure of a vehicle are selected from a group including snap-fitting elastic portions, screw receiving portions, and form-fitting fixation portions.

12. The module, according to claim 8, wherein said exterior structure of a vehicle is an exterior rear view mirror housing of a vehicle.

13. The module, according to claim 8, wherein said visor element is in a small angle inclined outwards and upwards with respect to a central vision line of the image detector, said small angle being approximately within an interval from 0 to 15 degrees.

14. The module, according to claim 8, wherein the window is arranged in a plane and has a window diameter, and a distance between said plane and zones of the visor element most protruding from said plane is not less than said window diameter.

* * * * *